United States Patent [19]
Bonet et al.

[11] Patent Number: 5,826,100
[45] Date of Patent: Oct. 20, 1998

[54] DIGITAL SIGNAL PROCESSOR FOR EXECUTING MULTIPLE INSTRUCTION WORDS

[75] Inventors: Luis A. Bonet; David Yatim; James W. Girardeau, Jr., all of Austin, Tex.

[73] Assignee: Motorola Inc., Schaumburg, Ill.

[21] Appl. No.: 743,605

[22] Filed: Nov. 4, 1996

Related U.S. Application Data

[62] Division of Ser. No. 397,447, Mar. 2, 1995, Pat. No. 5,600,674.

[51] Int. Cl.⁶ .................................................... G06F 15/78
[52] U.S. Cl. ...................................... 395/800.33; 395/562
[58] Field of Search ...................................... 395/562, 376, 395/800, 800.35, 800.32, 800.33

[56] References Cited

U.S. PATENT DOCUMENTS

| 4,713,748 | 12/1987 | Magar et al. . | |
|---|---|---|---|
| 5,128,890 | 7/1992 | Girardeau, Jr. | 364/757 |
| 5,276,819 | 1/1994 | Rau et al. | 395/375 |
| 5,506,798 | 4/1996 | Shimada et al. | 364/724.12 |

OTHER PUBLICATIONS

Texas Instruments, *TMS32010 User'Guide*, Digital Signal Processor Products, 1983, pp. 2–2 to 2–3, 2–6, 3–5 to 3–7, 3–10 3–14, 3–25, 3–31, 3–39 to 3–41, 3–43, and 3–60.

*Primary Examiner*—Richard L. Ellis

[57] ABSTRACT

A digital signal processor (10) includes a primary data bus (12), a primary instruction bus (14), a program control unit (16), an arithmetic unit (18), and a multiplier (20). Within the program control unit (16), multi-instruction words are issued from program memory (22) to the primary instruction bus (14). These multi-instruction words allow both logical and arithmetic instructions to be performed simultaneously. The arithmetic unit (18) includes a secondary data bus (44) which couples the arithmetic unit to the accumulator (34). The arithmetic unit (18) also includes a barrel shifter (48) having sign extension to reduce the number of operations required to shift data. The arithmetic logic unit (32) further includes complex arithmetic functions resulting in fewer operations per instruction and a multiplier (50) which is used for filtering operations in digital filtering and by the arithmetic unit (18).

6 Claims, 3 Drawing Sheets

DIGITAL SIGNAL PROCESSOR FOR EXECUTING MULTIPLE INSTRUCTION WORDS

This application is a division of prior application Ser. No. 08/397,447 filed Mar. 02, 1995 now U.S. Pat. No. 5,600,674.

Field of the Invention

This invention relates generally to signal processing systems and more particularly to reduced power digital signal processors and adaptive differential pulse code modulation (ADPCM) coder/decoders (CODEC).

BACKGROUND OF THE INVENTION

Digital signal processors and ADPCM CODEC's are known in the art and innovations in their design and structure have supported great leaps in digitally based communication systems. Digital signal processors (DSPs) typically include a data bus, an instruction bus, a program control unit, data memory, program memory, and an arithmetic unit. The data bus provides a means for transferring data between the data memory, external memory, the arithmetic unit, and the control unit. The instruction bus provides a means for the program control unit to retrieve instructions from the program memory and provides such instructions to the arithmetic unit. Upon receiving an instruction and data, the arithmetic unit performs the indicated operation upon the data, where the operation may be a logical operation, arithmetic function, or combination thereof.

ADPCM CODECs typically comprise the components included in a DSP as well as additional components. The additional components typically include an analog to digital (A/D) converter and a digital to analog (D/A) converter. The A/D converter typically includes both a sigma-delta modulator and a digital filter. In operation, the sigma-delta modulator receives an analog signal and produces a digital representation thereof. The digital filter filters the digital representation to remove noise introduced in the sampling process. The resulting digital signal is processed by the DSP portion. Concurrently, a digital signal is received and reverse processed by the DSP portion which is subsequently provided to the D/A converter. The D/A converter includes a receive digital filter, a digital modulator, and analog filter to transform the processed digital signal into an analog signal.

As is known, ADPCM CODECs are used in, among other applications, digital cordless telephone systems where ADPCM CODECs reside in both a portable hand-held unit and a base station. Analog data is transmitted to, and received from, the user by an ADPCM CODEC located in the portable unit. The ADPCM CODECs, in conjunction, facilitate communication, in a digital format, between the portable unit and the base unit.

As technology has advanced, the requirement of low power consumption by DSPs and ADPCM CODECs has become prevalent. As those skilled in the art will readily appreciate, power consumption may be reduced in an integrated circuit (IC), such as a DSP or ADPCM CODEC, by lowering the operating voltage. As the operating voltage is reduced, however, the switching period of the components of the DSP increases. To compensate for the increased switching period, the system clock is run at a slower rate, thereby reducing the operating speed of the DSP.

Another power reduction technique is to reduce the capacitance of the buses, or its effects, in the DSP. As is known, capacitance may be reduced by decreasing the length of the bus. While this reduces capacitance, it is not always achievable. Excessive power consumption due to higher capacitance may also be reduced by limiting the use of the bus or by lower the operating rate of the system. Each of these techniques has associated consequences, such as additional die area, lower operating speed, or more complex coding.

Therefore, a need exists for a DSP and/or an ADPCM CODEC that have lower power consumption requirements but without the above mentioned limitations.

DESCRIPTION OF A PREFERRED EMBODIMENT

Generally, the present invention provides a method and apparatus for a digital signal processor (DSP) and/or an adaptive differential pulse code modulation (ADPCM) transcoder having decreased power consumption and higher performance. This is accomplished by modifying instruction words to include dual operations, utilizing barrel shift instructions, and by adding a second data bus within the arithmetic unit. With such a method and apparatus, power consumption of a DSP or ADPCM CODEC having low voltage requirements is reduced without effecting the operating speed or increasing the die.

Figure 1:
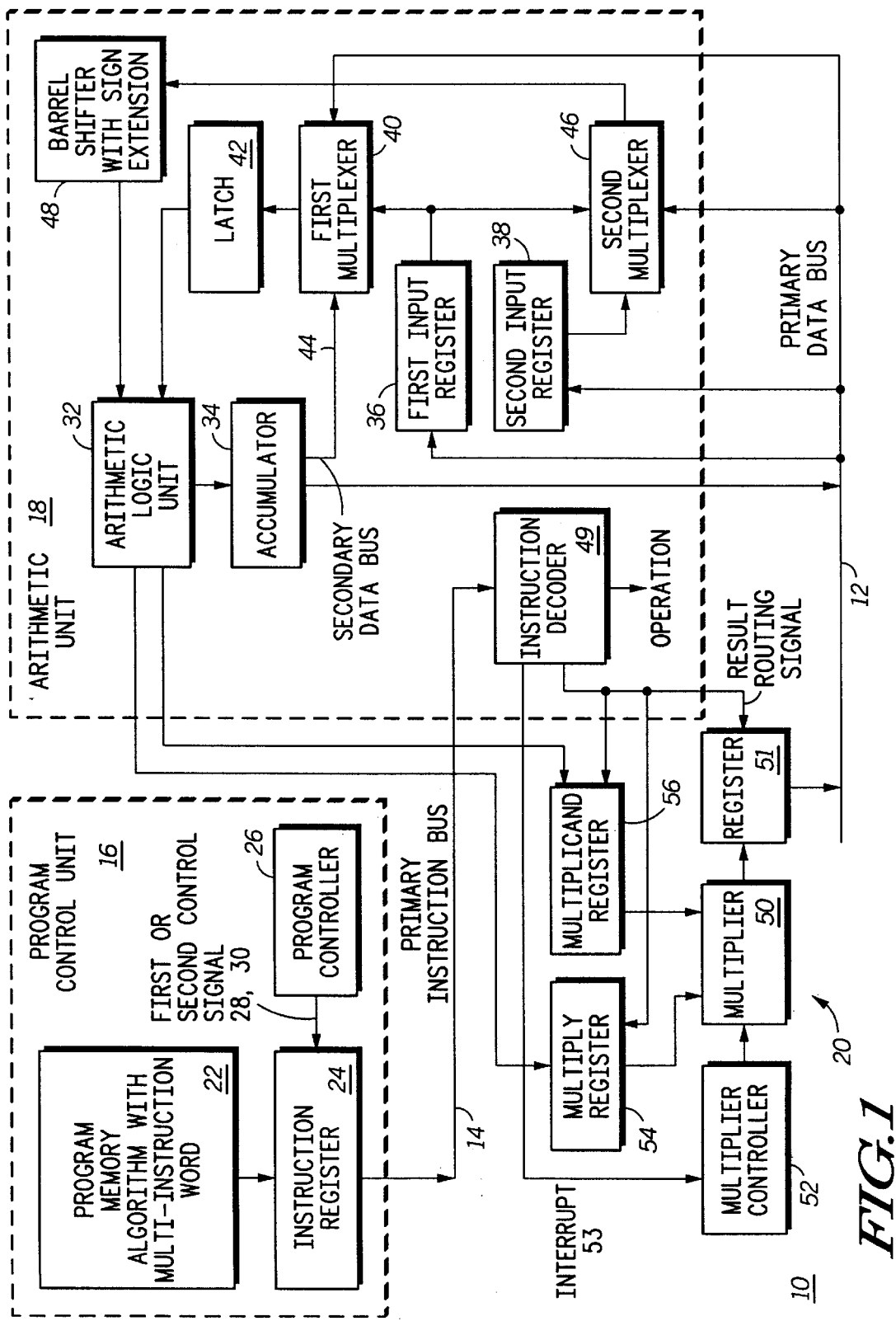
FIG. 1 illustrates a block diagram of a digital signal processor in accordance with the present invention.

FIG. 1 illustrates a digital signal processor (DSP) 10 that includes a primary data bus 12, a primary instruction bus 14, a program control unit 16, and an arithmetic unit 18. Both the primary data bus 12 and primary instruction bus 14 are of a construction known in the art and will not be discussed further herein.

The program control unit 16 includes program memory 22, an instruction register 24, and a program controller 26. The program memory 22 includes algorithms that control the operation of the DSP. Preferably, these algorithms include a plurality of operations wherein at least some of the plurality of operations include multi-instruction words. These multi-instruction words include more information than prior words did and typically will provide for at least two operations in one multi-instruction word. In this fashion, a multi-instruction word may include both an arithmetic function and a logical function. The logical function may include a branch instruction, a data transfer instruction, or any other logical instruction; while the arithmetic function may include any of a number of arithmetic functions such as: A+B, A−B, A AND B, A XOR B, −A+B, A+|B|, and A*B. Therefore, the arithmetic operations available in the digital processor 10 of the present invention allow more complex arithmetic operations to occur in a given number of clock cycles. Because complex arithmetic operations can be performed in fewer cycles than in previous DSPs, power consumption of the DSP 10 is reduced. From this, the operating rate of the DSP 10 may be reduced and/or the input voltage may be reduced in comparison with prior art processors and maintain an equivalent performance level of the prior art processors.

The program controller 26 determines how the instructions shall be retrieved from program memory 22 and issued to the instruction bus 14. The program controller 26 produces a first control signal 28 and a second control signal 30 which control the instruction register 24. The instruction register 24 temporarily stores at least one of the plurality of operations when the first control signal 28 is received and provides the instruction to the arithmetic unit 18 over the primary instruction bus 14 when the second control signal 30 is received.

The arithmetic unit 18 includes an arithmetic logic unit 32, an accumulator 34, a first input register 36, a second input register 38, a first multiplexer 40, a latch 42, a second multiplexer 46, and a barrel shifter with sign extension 48. The arithmetic unit 18 also preferably includes an instruction decoder 49 for receiving instructions over the primary instruction bus 14 from the program control unit 16.

The arithmetic logic unit 32 performs a variety of arithmetic operations as determined by the current instruction. The arithmetic logic unit 32 provides data to an accumulator 34, receives data from the latch 42 and from the barrel shifter 48. Data enters the arithmetic unit 18 via the primary data bus 12 and is retrieved into the first input register 36, the second input register 38, the first multiplexer 40, and the second multiplexer 46. The path upon which data enters the arithmetic unit 18 is determined by the instruction performed. Further, an algorithm may require that two data reads occur on the primary data bus 12. Therefore, multiple input paths and registers exist to buffer data until the operation may be performed. Data paths between the first input register 36, the first multiplexer 40, and the second multiplexer 46 allow data to be piped, as necessary, to perform arithmetic functions.

Arithmetic instructions may require that the arithmetic logic unit 32 operate simply on data received directly from the primary data bus 12. However, many arithmetic operations require that the accumulator 34 contents be used again in a calculation. Prior DSPs required that the accumulator contents 34 be transferred from the accumulator 34, across the primary data bus 12, and back into the first input register 36, the second input register 38, the first multiplexer 40, or the second multiplexer 46. This operation typically required additional clock cycles and caused the arithmetic unit 18 to consume additional power because of the accesses on the primary data bus 12 which has high parasitic capacitance. The DSP 10 of the present invention includes a secondary data bus 44, which transfers the contents of the accumulator 34 directly to the first multiplexer 40. The secondary data bus 44 has a lower parasitic capacitance than does the primary data bus 12 and therefore, the power consumption of the DSP 10 is reduced during an arithmetic operation using the accumulator 34 contents in a subsequent operation. Further, because the primary data bus 12 is not required during such an operation, the primary data bus 12 may be used for another operation, further increasing the performance of the DSP 10.

The barrel shifter with sign extension 48 allows a shift to be performed in fewer cycles than with a shifter not having sign carry. Prior barrel shifters did not include sign extension and therefore inserted zeros into the leading portion of the value being shifted. Thus, with prior barrel shifters, additional instructions had to be performed upon the result to ensure that the sign of the data being shifted was not corrupted. The barrel shifter 48 of the present invention reduces the number of cycles required to perform a shift and therefore reduces the power consumed by the DSP 10 to perform a shift. In a typical operation, this improvement alone provides significant power consumption savings.

The instruction decoder 49 interprets a received operation from the primary instruction bus 14 and determines whether the operation is a conditional, or unconditional, operation. When the received operation is a conditional operation, the instruction decoder 49 determines whether the condition is met. When the condition is met, it forwards the remaining instruction for operation. However, when the condition is not met, it does not forward the instruction for operation to the arithmetic unit 18 and prevents a needless operation. Prior DSPs had branch instructions. However, power was wasted when non-computational cycles were performed. With the conditional instructions of the present invention, more intelligent execution of instructions is performed and wasted instructions are not performed. Therefore, the instruction decoder 49 also assists in the reduction of power consumption of the DSP 10.

Preferably, the DSP 10 of the present invention also includes an external multiplier 20 that performs arithmetic multiplication functions. The multiplier 20 preferably includes a multiplier 50, a result register 51, a multiplier controller 52, a multiply (or multiplier) register 54, and a multiplicand register 56. When a multiply instruction is received in the instruction decoder 49, the instruction decoder 49 controls the multiplier 20 to perform the arithmetic operations. The instruction decoder 49 signals the multiplier controller 52 via an interrupt signal 53 to prepare for a multiplication. The multiply register 54 and the multiplicand register 56 receive data from the arithmetic logic unit 32 and feed the data to the multiplier 50. The multiplier 50, in turn, provides the result to the result register 51 which latches the data. The instruction decoder 49 then issues a result routing signal to the result register 51 in order to control the issuance of the result to the primary data bus 12.

The instruction decoder 49, by determining the outcome of a conditional instruction, prevents the arithmetic unit 18 from performing unnecessary instructions, also reducing power consumption. Additionally, the secondary data bus 44 allows the accumulator 34 to directly pipe data to the first multiplexer 40 without accessing the primary data bus 12. Less power is consumed on this data transfer than on a comparable data transfer over the data bus 12. The barrel shifter 48 with the sign extension reduces the number of operations required for a data shift, therefore maintaining sign integrity without requiring additional steps. Fewer operations allow the DSP 10 to consume less power.

Thus, the DSP 10 of the present invention includes important improvements that reduce the power consumption of the DSP 10 by maintaining performance levels at lower clocking frequencies. The multi-instruction words available to the DSP 10 allow instructions to be initiated in parallel so that fewer clock cycles are required to perform a given task.

Further, the additional arithmetic functions available to the arithmetic unit 18 provide the same benefit. Thus, the DSP 10 of the present invention operates at a lower voltage and at a lower clock frequency and therefore consumes less power.

Figure 2:
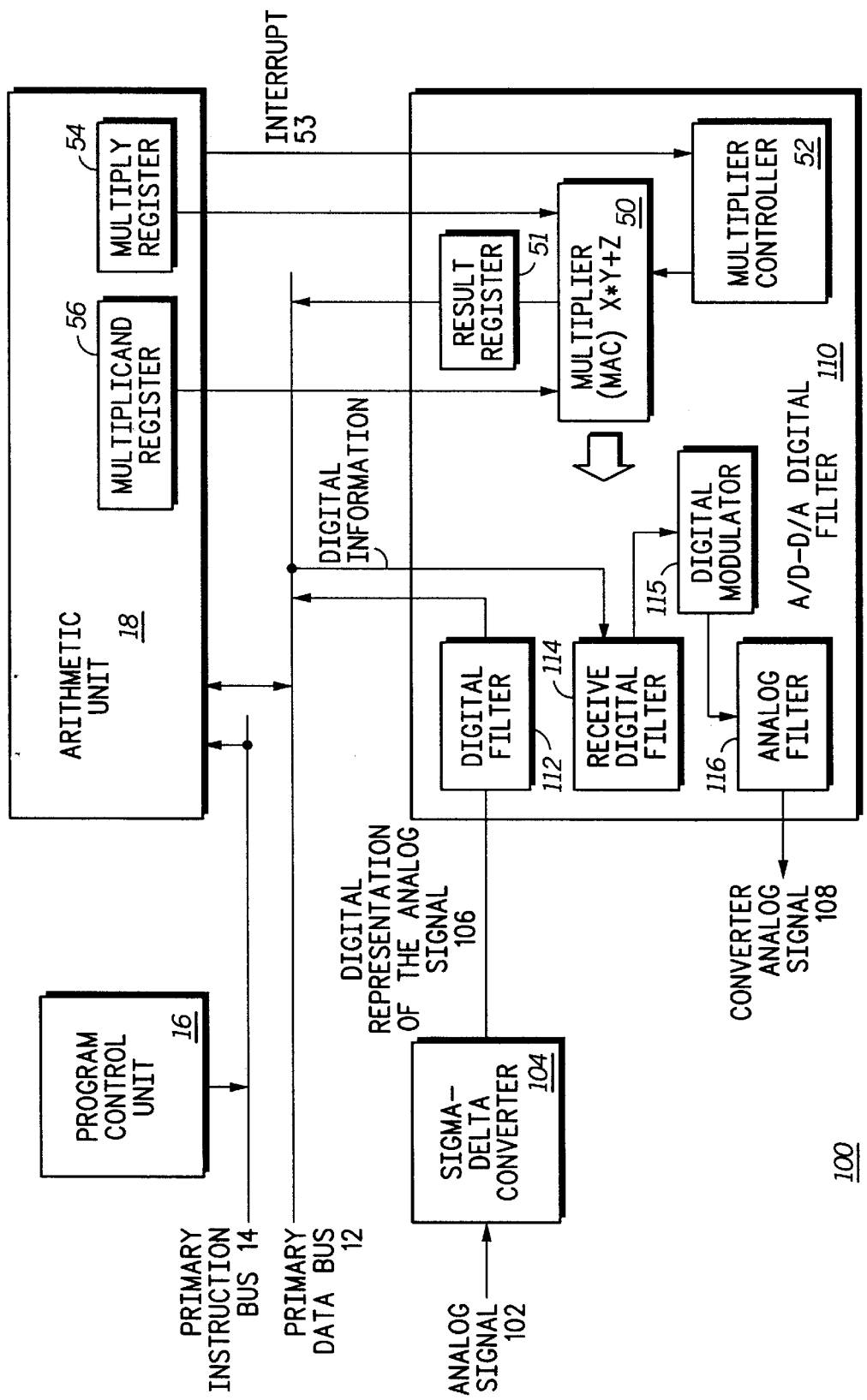
FIG. 2 illustrates a block diagram of an adaptive differential pulse code modulator in accordance with the present invention.

FIG. 2 illustrates an adaptive differential pulse code modulator (ADPCM) coder/decoder (CODEC) 100 of the present invention. The ADPCM CODEC 100 includes the components making up the DSP 10 as well as additional components. The additional components include a sigma-delta modulator 104 and an A/D-D/A digital filter 110. The sigma-delta modulator 104 converts an analog signal 102 to a digital representation of the analog signal 106. The A/D-D/A digital filter 110 comprises a digital filter (or transmit digital filter) 112, a receive digital filter 114, a digital modulator 115, an analog filter 116, the multiplier 50, and the multiplier controller 52.

The sigma-delta modulator receives an analog signal 102 and creates a digital representation of the analog signal 106. The digital filter 112 receives the digital representation of the analog signal 106, filters it to remove the high frequency noise created in the data conversion process, and provides the data in a linear format to the primary data bus 12. The receive digital filter 114 receives data from the primary data bus 12 in a linear format, filters the data, and transmits the data to the digital modulator 115 in a linear format. The digital modulator 115 receives the digital data and outputs a reduced bit representation of the data. The analog filter 116 then receives the signal from the digital modulator 115, filters the signal, and outputs a converted analog signal 108. Typically, the converted analog signal 108 would then be transmitted to a user via a speaker or to the central office over a standard phone line.

The multiplier 50 and the multiplier controller 52 serve important functions in the digital filtering process performed by the A/D-D/A digital filter 110. Because the A/D-D/A digital filter 110 requires a dedicated multiplier to use in the digital filtering process, the multiplier 50 is resident in the A/D-D/A digital filter 110. However, structure in the ADPCM CODEC 100 of the present invention allows the arithmetic unit 18 to access the multiplier 50 within the A/D-D/A digital filter 110 to perform multiply operations. The multiply register 54 and the multiplicand register 56, located within the arithmetic unit 18, supply data to the multiplier 50 over dedicated data lines. The interrupt line 53 from the arithmetic unit 18 provides an input to the multiplier controller 52 which interrupts the operation of the multiplier 50 upon an access by the arithmetic unit 18.

When the arithmetic unit 18 requires a multiplication operation, it loads the multiply value in the multiply register 54 and loads the multiplicand into the multiplicand register 56. The arithmetic unit 18 then issues an interrupt 53 to the multiplier controller. The multiplier controller 52 interrupts the multiplier 50, directs the multiplier 50 to load the contents of the multiply register 54 and the multiplicand register 56, and directs the multiplier 50 to perform the multiplication. Once the multiplication is complete, the multiplier 50 outputs the result of the multiply to the result register 51 and then selectively outputs the result on the primary data bus 12 as directed by the arithmetic unit via the result routing signal. Use of the multiplier 50 by the arithmetic unit 18 has little effect on the operation of the A/D-D/A digital filter 110 which is disabled during a multiply cycle. The ADPCM CODEC 100 of the present invention, therefore, contributes to a reduction in power consumption by sharing the multiplier between the A/D-D/A digital filter 110 and the arithmetic unit 18, components that both require the multiplier 50.

Figure 3:
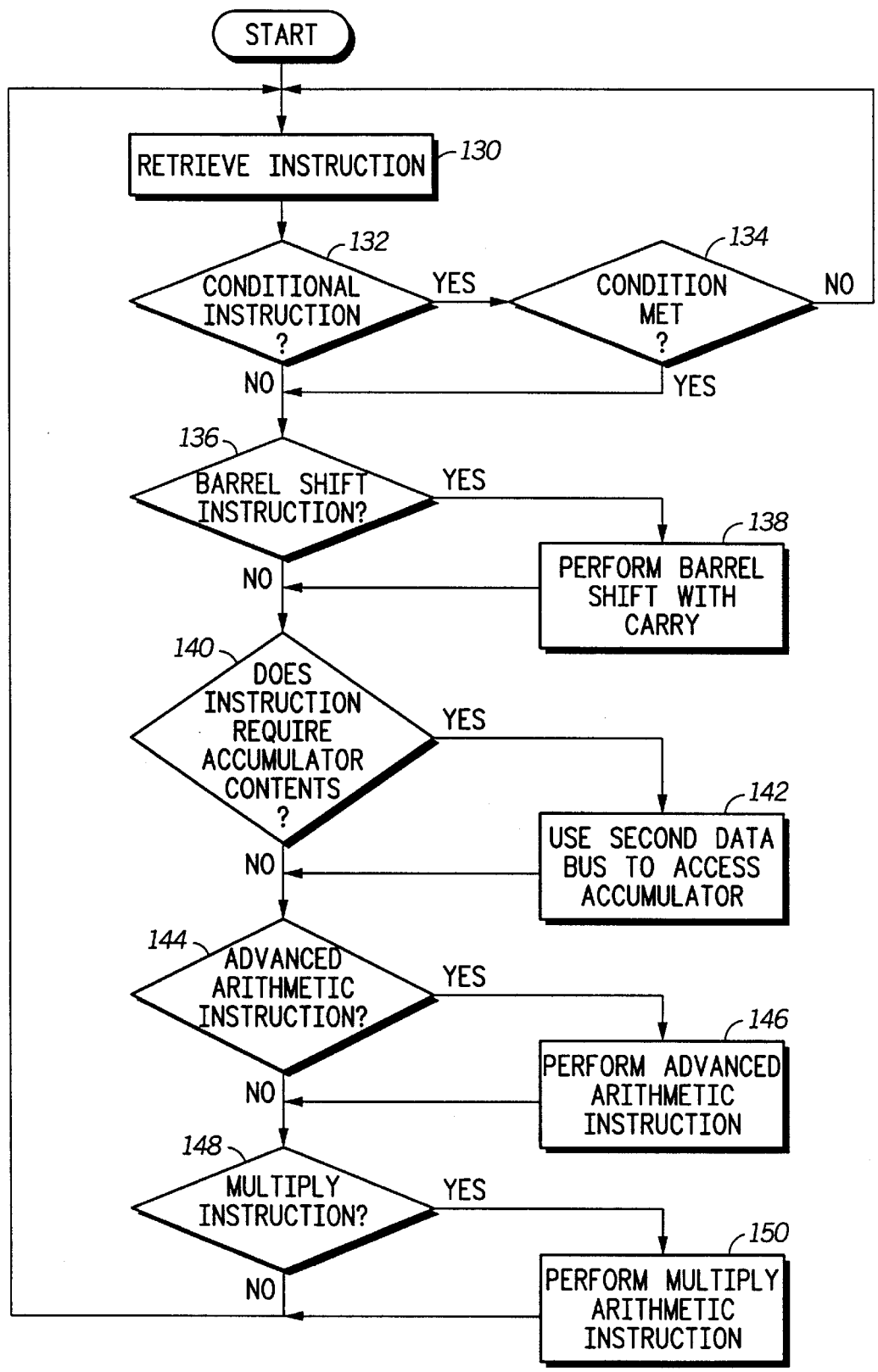
FIG. 3 illustrates a logic diagram that may be used to implement a DSP or an ADPCM CODEC in accordance with the present invention.

FIG. 3 illustrates a method of processing instructions in a DSP 10 or ADPCM CODEC 100. The method includes processing instructions in a manner to reduce power consumption of the device. The method begins at block 130, wherein an instruction is retrieved from program memory 22 into an instruction register 24 and provided to instruction decoder 49 over the primary instruction bus 14. Next, at decision block 132, it is determined whether the instruction is a conditional instruction. If it is a conditional instruction, the method proceeds to block 134, wherein it is determined whether the condition has been met. If, at block 134, the conditional is not met, the method returns to block 130. Thus, power consumption is reduced when the condition is not satisfied.

If, at decision block 132, the instruction is not a conditional instruction or the condition has been met, the method proceeds to decision block 136, wherein it is determined whether the instruction is a barrel shift instruction. If the instruction is a barrel shift instruction, the method proceeds to block 138, wherein a barrel shift is performed with a carry. From block 138, the method proceeds to block 140. If, at block 136, the instruction is not a barrel shift instruction, the method proceeds to decision block 140, where it is determined whether the instruction requires the accumulator contents. If the instruction requires the accumulator contents to be written into the first multiplexer 40, the method proceeds to block 142, wherein the secondary data bus 44 is employed to transfer the contents of the accumulator 34 to the first multiplexer 40. From block 142, the method proceeds to block 140.

If, at decision block 140, the instruction does not require the accumulator contents, the method proceeds to decision block 144, wherein it is determined whether the instruction requires advanced arithmetic operations. If the instruction does require advanced arithmetic calculation, the method proceeds to block 146, wherein the advanced arithmetic instruction is performed. From block 146, the method proceeds to block 148. If, at decision block 144, the instruction does not require an advanced arithmetic instruction, the method proceeds to block 148, wherein it is determined whether the instruction is a multiply instruction. If the instruction is a multiply instruction, the method proceeds to block 150, wherein the multiply instruction is performed using a multiplier contained within a digital filter associated with the DSP 10. From block 150, the method returns to block 130. If, at block 148, the instruction is not a multiply instruction, the method returns to block 130.

The present invention provides a method and apparatus for a digital signal processor (DSP) and/or an adaptive differential pulse code modulation (ADPCM) transcoder having decreased power consumption and higher performance. With such a method and apparatus, power consumption of a DSP or ADPCM CODEC having low voltage requirements is reduced without effecting the operating speed or increasing the die area.

We claim:
1. A Digital Signal Processor comprising:
   (a) a primary data bus;
   (b) a primary instruction bus;
   (c) program control unit operably coupled to the primary instruction bus, wherein the program control unit includes:
      (i) program memory that stores an algorithm, wherein the algorithm includes a plurality of operations, and wherein at least some of the plurality of operations include multiple-instruction words;
      (ii) instruction register that temporarily stores at least one of the plurality of operations when a first control signal is received and provides the at least one of the plurality of operations to the primary instruction bus when a second control signal is received; and
      (iii) program controller operably coupled to the program memory, wherein the program controller generates the first and second control signals; and
   (d) arithmetic unit operably coupled to the program control unit and the primary data bus, wherein the arithmetic unit includes:
      (i) an arithmetic logic unit;
      (ii) an accumulator operably coupled to the arithmetic logic unit and the primary data bus;
      (iii) a first input register operably coupled to the primary data bus;

(iv) a second input register operably coupled to the primary data bus;

(v) a first multiplexer operably coupled to the first input register, the primary data bus, the arithmetic logic unit, and the accumulator, wherein the first multiplexer is coupled to the accumulator via a secondary data bus, wherein the secondary data bus has less parasitic capacitance than the primary data bus;

(vi) a second multiplexer operably coupled to the second input register, the primary data bus, and the first input register; and (vii) a barrel shifter having sign extension, wherein the barrel shifter is operably coupled to the second multiplexer and the arithmetic logic unit.

2. The Digital Signal Processor of claim 1, wherein the multiple-instruction words each comprise a logical function and an arithmetic function.

3. The Digital Signal Processor of claim 1, wherein the arithmetic unit comprises an instruction decoder that receives an operation of the plurality of operations from the program control unit via the primary instruction bus.

4. The Digital Signal Processor of claim 3 wherein the instruction decoder interprets a received operation to determine whether the operation is a conditional operation, wherein, when the received operation is a conditional operation, the instruction decoder determines whether a condition of the conditional operation is met, and when the condition is met, forwarding remaining instructions for the operation.

5. The Digital Signal Processor of claim 1 further comprising:

(e) a multiplier operably coupled to the primary data bus;

(f) a multiplicand register operably coupled to the multiplier;

(g) a multiply register operably coupled to the multiplier; and (h) a multiplier controller operably coupled to the multiplier, wherein the multiplier controller interrupts the multiplier while the multiplier is performing a first series of multiplications to perform a multiplication of data stored in the multiplicand register and the multiply register.

6. The Digital Signal Processor of claim 1 wherein the arithmetic logic unit further comprises additional logic to perform mathematical functions of A+B, A−B, A AND B, A XOR B, −A+B, and A+|B|.

* * * * *